US009914455B2

(12) United States Patent
Nemoto

(10) Patent No.: US 9,914,455 B2
(45) Date of Patent: Mar. 13, 2018

(54) CONTROL APPARATUS OF VEHICLE

(71) Applicant: TOYOTA JIDOSHA KABUSHIKI KAISHA, Toyota-shi (JP)

(72) Inventor: Yusuke Nemoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/244,554

(22) Filed: Aug. 23, 2016

(65) Prior Publication Data
US 2017/0072954 A1 Mar. 16, 2017

(30) Foreign Application Priority Data
Sep. 15, 2015 (JP) ................................. 2015-182346

(51) Int. Cl.
B60W 30/00 (2006.01)
B60W 40/00 (2006.01)
B60W 50/00 (2006.01)
B60W 30/16 (2012.01)
B60W 40/107 (2012.01)
B60W 50/06 (2006.01)

(52) U.S. Cl.
CPC ........ B60W 30/162 (2013.01); B60W 40/107 (2013.01); B60W 50/06 (2013.01); B60W 2050/0008 (2013.01); B60W 2050/0012 (2013.01); B60W 2420/52 (2013.01); B60W 2520/105 (2013.01); B60W 2550/402 (2013.01); B60W 2550/408 (2013.01); B60W 2720/106 (2013.01); B60W 2750/302 (2013.01); B60W 2750/306 (2013.01); B60W 2750/308 (2013.01)

(58) Field of Classification Search
CPC .... B60W 30/00; B60W 30/16; B60W 30/162; B60W 40/10; B60W 40/107; B60W 50/00; B60W 50/06; B60K 31/00; B60K 31/0008
See application file for complete search history.

(56) References Cited

U.S. PATENT DOCUMENTS 9,043,088 B2 * 5/2015 Isaji ..................... B62D 15/025
701/41
2015/0178247 A1 * 6/2015 Kinoshita ............. B60W 30/14
702/179

(Continued)

FOREIGN PATENT DOCUMENTS

JP 2009-018727 A 1/2009
JP 2012-025352 A 2/2012
JP 2015-51716 3/2015

Primary Examiner — Yonel Beaulieu
(74) Attorney, Agent, or Firm — Oblon, McClelland, Maier & Neustadt, L.L.P.

(57) ABSTRACT

The invention relates to a control apparatus of a vehicle. The apparatus calculates a requested acceleration of an own vehicle on the basis of feedback and feedforward requested accelerations and executes a following travel control for causing the own vehicle to travel following a communicating preceding vehicle by controlling an acceleration of the own vehicle such that the acceleration of the own vehicle corresponds to the requested acceleration. The apparatus sets the feedforward requested acceleration to zero when an own vehicle sensor device has not detected the preceding vehicle and the feedforward requested acceleration is larger than zero after starting an execution of the following travel control.

4 Claims, 6 Drawing Sheets

(56) References Cited

U.S. PATENT DOCUMENTS

| | | | |
|---|---|---|---|
| 2015/0274162 A1* | 10/2015 | Sato | B60W 10/04 |
| | | | 701/23 |
| 2016/0200320 A1 | 7/2016 | Nemoto | |
| 2017/0015203 A1* | 1/2017 | Oguri | B60L 7/18 |
| 2017/0072953 A1* | 3/2017 | Nemoto | B60W 30/16 |
| 2017/0072954 A1* | 3/2017 | Nemoto | B60W 30/162 |
| 2017/0072956 A1* | 3/2017 | Nemoto | B60W 30/162 |
| 2017/0072957 A1* | 3/2017 | Nemoto | B60W 30/17 |
| 2017/0082452 A1* | 3/2017 | Sumizawa | B60W 30/10 |
| 2017/0116854 A1* | 4/2017 | Sugawara | G01C 21/3492 |
| 2017/0120912 A1* | 5/2017 | Ishioka | B60W 30/143 |

* cited by examiner

CONTROL APPARATUS OF VEHICLE

BACKGROUND OF THE INVENTION

Technical Field

The present invention relates to a control apparatus of a vehicle for causing an own vehicle to travel following a preceding vehicle by using information on the preceding vehicle received through a wireless communication.

Description of the Related Art

In JP 2015-51716 A, there is described a control apparatus of a vehicle for controlling an acceleration of an own vehicle to cause the own vehicle to travel following a preceding vehicle on the basis of information on an acceleration of the preceding vehicle received through a wireless communication. Hereinafter, this control apparatus will be referred to as "the conventional apparatus".

The conventional apparatus includes an own vehicle sensor such as a millimeter wave radar. The own vehicle sensor outputs an output wave ahead of the own vehicle and when a preceding vehicle, which is a vehicle traveling in front of the own vehicle, exists, the own vehicle sensor receives a wave reflected by the preceding vehicle. The conventional apparatus acquires a distance between the own vehicle and the preceding vehicle (hereinafter, this distance will be referred to as "the inter-vehicle distance") on the basis of the wave reflected by the preceding vehicle and received by the own vehicle sensor. Further, the conventional apparatus acquires a speed of the own vehicle (hereinafter, this speed will be referred to as "the own vehicle speed"). In addition, the conventional apparatus acquires preceding vehicle acceleration information on the acceleration of the preceding vehicle from the preceding vehicle via a wireless communication.

The conventional apparatus acquires an inter-vehicle time by dividing the acquired inter-vehicle distance by the acquired own vehicle speed and calculates a feedback requested acceleration which is an acceleration of the own vehicle requested for causing the inter-vehicle time to correspond to a target inter-vehicle time corresponding to a target value of the inter-vehicle time on the basis of a difference between the inter-vehicle time and the target inter-vehicle time. Further, the conventional apparatus calculates a feedforward requested acceleration which is an acceleration of the own vehicle requested for causing the own vehicle to travel following the preceding vehicle on the basis of the acquired preceding vehicle acceleration information.

Lastly, the conventional apparatus sets a total value of the feedback requested acceleration and the feedforward requested acceleration as a requested acceleration of the own vehicle and accelerates or decelerates the own vehicle to achieve the requested acceleration.

SUMMARY OF THE INVENTION

When a guardrail is provided at the side of the road, on which the own vehicle travels, the own vehicle sensor receives the wave reflected by the guardrail. In this case, the own vehicle sensor receives both of the wave reflected by the preceding vehicle and the wave reflected by the guardrail simultaneously. Thus, a state that the conventional apparatus cannot detect the preceding vehicle may occur temporarily even when the conventional apparatus uses the reflected wave received by the own vehicle sensor. Further, even when the preceding vehicle exists, the state that the conventional apparatus cannot detect the preceding vehicle may occur due to various reasons other than the reason described above.

In addition, when the preceding vehicle exists and the own vehicle sensor of the conventional apparatus cannot detect the preceding vehicle, the preceding vehicle continues to send the preceding vehicle acceleration information to the own vehicle. Therefore, the conventional apparatus can calculate the feedforward requested acceleration on the basis of the preceding vehicle acceleration information sent from the preceding vehicle. In many cases, an occurrence of the state that the own vehicle sensor cannot detect the preceding vehicle is temporal and thus, the own vehicle sensor is likely to restart the detection of the preceding vehicle. In this case, the continuation of the acceleration control executed in the own vehicle on the basis of the calculated feedforward requested acceleration is advantageous to a smooth restart of the travel of the own vehicle following the preceding vehicle under the temporal state that the own vehicle sensor cannot detect the preceding vehicle. In this regard, the feedforward requested acceleration calculated under the state that the own vehicle sensor cannot detect the preceding vehicle may be a positive value (that is, a value of requesting the acceleration of the own vehicle). In this case, the own vehicle is accelerated. For example, when a vehicle having no wireless communication function exists between the own vehicle and the vehicle sending its acceleration information to the own vehicle, for example, when a vehicle having no wireless communication function comes between the own vehicle and the vehicle sending its acceleration information to the own vehicle, the excessive decrease of the inter-vehicle distance may occur. Further, when the own vehicle sensor does not detect a vehicle having the wireless communication function and thus, the conventional apparatus does not identify the vehicle as the preceding vehicle, the excessive decrease of the inter-vehicle distance may occur.

The present invention has been made for solving the above-described problem. One object of the present invention is to provide a control apparatus of a vehicle which can cause the own vehicle to travel following the preceding vehicle accurately while preventing the excessive decrease of the inter-vehicle distance between the own vehicle and the preceding vehicle even when the state that the own vehicle sensor has not detected the preceding vehicle occurs.

The control apparatus of the vehicle according to the present invention comprises:

an own vehicle sensor (61) configured to output an output wave ahead of an own vehicle (10) and detect a reflected wave of the output wave;

an own vehicle sensor device (60) configured to detect a vehicle traveling in front of the own vehicle (10) as a preceding vehicle on the basis of the reflected wave detected by the own vehicle sensor (61) and acquire an inter-vehicle distance (D) between the own vehicle (10) and the preceding vehicle on the basis of the reflected wave;

a wireless communication device (80, 81) configured to acquire communicating preceding vehicle information including communicating preceding vehicle acceleration information (Gs, Gas) on an acceleration of a communicating preceding vehicle (11), the communicating preceding vehicle (11) being the preceding vehicle having a function of a wireless communication; and an acceleration/deceleration control device (20, 30, 40) configured to control an acceleration of the own vehicle

(10) such that the acceleration of the own vehicle (10) corresponds to a requested acceleration (Gj) of the own vehicle (10).

The acceleration/deceleration control device (20,30,40) includes first to third calculation means. The first calculation means is configured to calculate a feedback requested acceleration (GFB) on the basis of the inter-vehicle distance (D) and a target inter-vehicle distance (Dtgt) (see a step 265 of FIG. 2 and a routine of FIG. 5). The feedback requested acceleration (GFB) is an acceleration requested to the own vehicle (10) for maintaining the inter-vehicle distance (D) at the target inter-vehicle distance (Dtgt).

The second calculation means is configured to calculate a feedforward requested acceleration (GFF) on the basis of the communicating preceding vehicle acceleration information (Gs, Gas) (see a step 260 of FIG. 2 and a routine of FIG. 4). The feedforward requested acceleration (GFF) is an acceleration requested to the own vehicle (10) for causing the own vehicle (10) to travel following the communicating preceding vehicle (11).

The third calculation means is configured to calculate the requested acceleration (Gj) of the own vehicle (10) on the basis of the feedback and feedforward requested accelerations (GFB and GFF) (see a step 270 of FIG. 2).

The acceleration/deceleration control device (20, 30, 40) is configured to execute a following travel control for causing the own vehicle (10) to travel following the communicating preceding vehicle (11) by controlling the acceleration of the own vehicle (10) such that the acceleration of the own vehicle (10) corresponds to the requested acceleration (Gj) calculated by the third calculation means (see a step 275 of FIG. 2).

According to the following travel control, the own vehicle is caused to travel following the communicating preceding vehicle at an acceleration set on the basis of the acceleration of the communicating preceding vehicle while the inter-vehicle distance is maintained at a predetermined distance (i.e., the target inter-vehicle distance).

In addition, the third calculation means is configured to set the feedforward requested acceleration (GFF) to zero (see a step 440 of FIG. 4) when the own vehicle sensor device (60) has not detected the preceding vehicle (see a determination of "No" at a step 415 of FIG. 4) and the feedforward requested acceleration (GFF) is larger than zero (see a determination of "Yes" at a step 435 of FIG. 4) after an execution of the following travel control is started.

The communicating preceding vehicle acceleration information (Gs, Gas) may include information on a requested acceleration (Gs) of the communicating preceding vehicle (11) calculated by the communicating preceding vehicle (11) on the basis of operation amounts (Accp, Brkp) of an acceleration operator and a brake operator of the communicating preceding vehicle (11).

Further, the communicating preceding vehicle acceleration information (Gs, Gas) may include information on a requested acceleration (Gs) of the communicating preceding vehicle (11) calculated by a control apparatus of the communicating preceding vehicle (11) on the basis of information on an acceleration of a vehicle traveling in front of the communicating preceding vehicle (11) acquired by a wireless communication device of the communicating preceding vehicle (11) from the vehicle traveling in front of the communicating preceding vehicle (11) when the control apparatus of the communicating preceding vehicle (11) executes the same control as the following travel control for causing the communicating preceding vehicle (11) to travel following the vehicle traveling in front of the communicating preceding vehicle (11).

Thereby, when the own vehicle sensor device has not detected the preceding vehicle and the feedforward requested acceleration is larger than zero, the feedforward requested acceleration is set to zero. That is, the feedforward requested acceleration is limited to a value equal to or smaller than zero. Thus, the feedforward requested acceleration is equal to or smaller than zero. Therefore, the acceleration of the own vehicle derived from the feedforward requested acceleration is prevented. As a result, the excessive decrease of the inter-vehicle distance between the own vehicle and the preceding vehicle is prevented.

The acceleration/deceleration control device (20, 30, 40) may be configured to stop a control of the acceleration of the own vehicle (10) using the communicating preceding vehicle acceleration information (Gs, Gas) when an elapsed time becomes equal to or larger than a predetermined time, the elapsed time being a time elapsed since the own vehicle sensor (61) does not detect the preceding vehicle after the execution of the following travel control is started. As described above, in many cases, the state that the own vehicle sensor device cannot detect the preceding vehicle occurs temporarily. Therefore, when the elapsed time becomes equal to or larger than the predetermined time, a vehicle to be identified as the preceding vehicle may not exist, for example, due to a lane change of the preceding vehicle.

When the preceding vehicle does not exist, the communicating preceding vehicle acceleration information acquired by the wireless communication device of the own vehicle is not information on the acceleration of the preceding vehicle any more. In this case, the control of the acceleration of the own vehicle using the communicating preceding vehicle acceleration information is desirably stopped. Thereby, the execution of the control of the acceleration of the own vehicle using information on the acceleration of the vehicle which is not the preceding vehicle is prevented by stopping the control of the acceleration of the own vehicle using the communicating preceding vehicle acceleration information when the elapsed time becomes equal to or larger than the predetermined time.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a control apparatus of a vehicle according to an embodiment of the present invention will be described with reference to the drawings. Hereinafter, the control apparatus according to the embodiment will be referred to as "the embodiment control apparatus". In the description, the drawings and the claims, an own vehicle is a subject vehicle, to which the present invention is applied and a preceding vehicle is a vehicle which travels in front of the own vehicle, is acquired by a sensor installed in the own vehicle as described later and outputs information permitted to be used by the control apparatus of the own vehicle to change a control for causing the own vehicle to travel.

Figure 1:
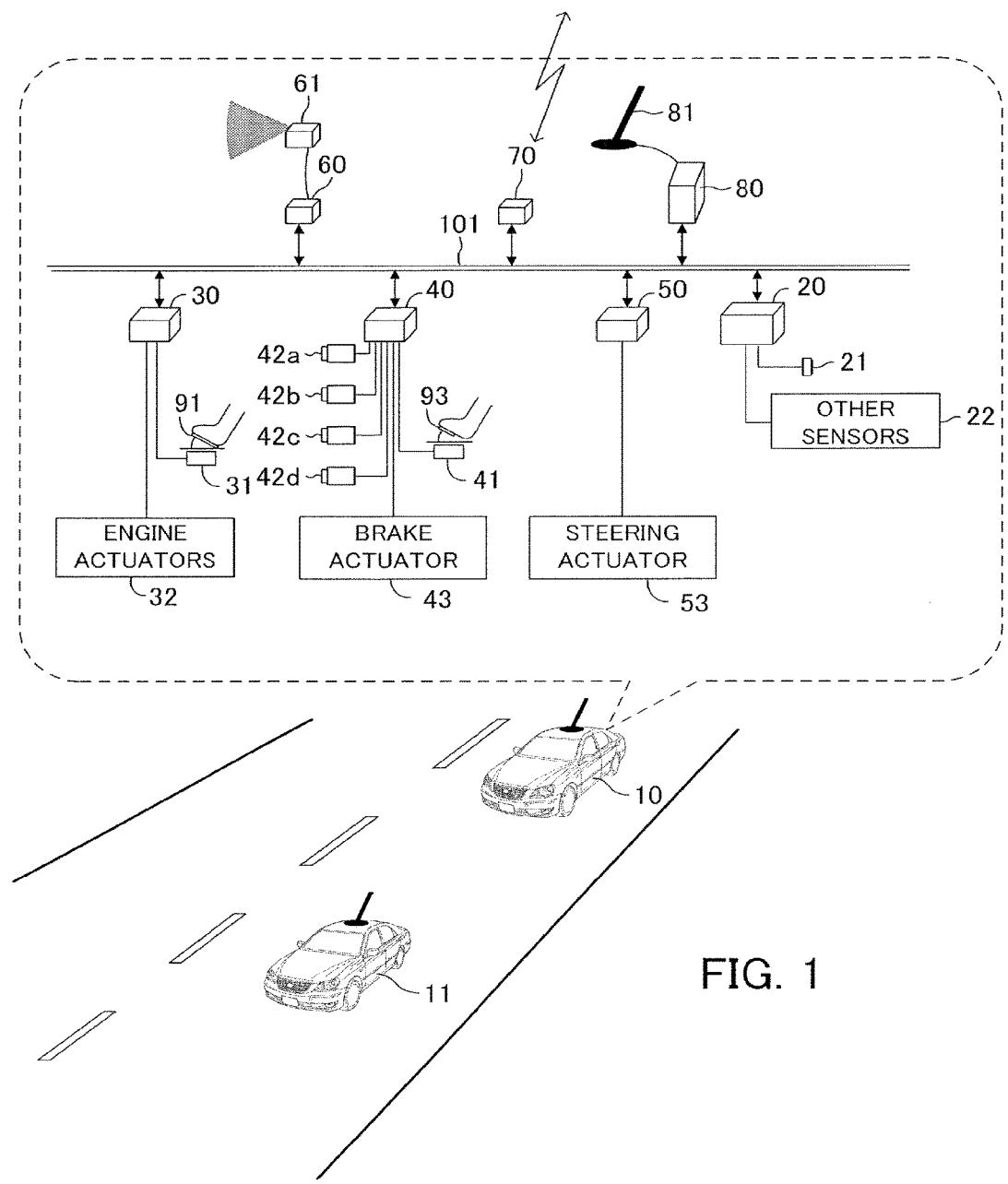
FIG. 1 is a general configuration view for showing a control apparatus of a vehicle according to an embodiment of the present invention and the vehicle installed with the control apparatus.

As shown in FIG. 1, the embodiment control apparatus is applied to a vehicle (an own vehicle) 10. The own vehicle 10 comprises a vehicle control ECU 20, an engine control ECU 30, an acceleration pedal operation amount sensor 31, a brake control ECU 40, a brake pedal operation amount sensor 41, vehicle wheel speed sensors 42a to 42d, a steering control ECU 50, a sensor ECU 60, an own vehicle sensor 61, a GPS device 70, a wireless communication control ECU 80 and a wireless antenna 81. A preceding vehicle 11 has the same configuration as the configuration of the own vehicle 10.

The vehicle control ECU 20 can send data to and receive data from, that is, can communicate with the engine control ECU 30, the brake control ECU 40, the steering control ECU 50, the sensor ECU 60, the GPS device 70 and the wireless communication control ECU 80 via a communication/sensor system CAN (i.e., a communication/sensor system Controller Area Network) 101. Each of the ECUs is an electronic control unit and includes, as a main part, a microcomputer including a CPU, a ROM, a RAM, an interface and the like. The CPU is configured or programmed to execute instructions (or programs) stored in a memory (i.e., the ROM) to realize various functions described later.

The vehicle control ECU 20 is electrically connected to a cooperative following travel control request switch 21 which is an ON-OFF switch and various sensors 22. Hereinafter, the cooperative following travel control request switch 21 will be referred to as "the CACC switch 21". When the CACC switch 21 is set to an ON-position by an occupant (in particular, a driver) of the own vehicle 10, a start of an execution of a cooperative following travel control described later is requested to the vehicle control ECU 20. The cooperative following travel control includes an inter-vehicle distance control described later.

The engine control ECU 30 is known and is configured or programmed to acquire detection signals from sensors (not shown) configured to detect various amounts of operation states of an internal combustion engine (not shown). In particular, the engine control ECU 30 is electrically connected to the acceleration pedal operation amount sensor 31.

The acceleration pedal operation amount sensor 31 detects an operation amount Accp of an acceleration pedal 91 as an acceleration operator (hereinafter, the operation amount Accp of the acceleration pedal 91 will be referred to as "the acceleration pedal operation amount Accp") and outputs a detection signal expressing the acceleration pedal operation amount Accp to the engine control ECU 30. The engine control ECU 30 is configured or programmed to acquire the acceleration pedal operation amount Accp on the basis of the detection signal, calculate or acquire a requested acceleration Gj on the basis of the acquired acceleration pedal operation amount Accp and store the calculated requested acceleration Gj in the RAM of the engine control ECU 30. It should be noted that the engine control ECU 30 may be configured or programmed to calculate the requested acceleration Gj on the basis of a traveling speed SPDj of the own vehicle 10 acquired as described later and an engine speed NE. Hereinafter, the traveling speed SPDj will be referred to as "the own vehicle speed SPDj".

Further, engine actuators 32 including a throttle valve actuator (not shown) are electrically connected to the engine control ECU 30. The engine control ECU 30 is configured or programmed to activate the engine actuators 32 to change a torque generated by the engine (not shown) of the own vehicle 10 such that an acceleration of the own vehicle 10 approaches the requested acceleration Gj when the requested acceleration Gj of the own vehicle 10 is a positive value, that is, when the own vehicle 10 is requested to be accelerated.

The brake control ECU 40 is known and is configured or programmed to acquire detection signals from sensors (not shown) configured to detect various amounts of operation states of the own vehicle 10 (hereinafter, the amounts will be referred to as "the vehicle operation state amounts"). In particular, the brake control ECU 40 is electrically connected to the brake pedal operation amount sensor 41 and the vehicle wheel speed sensors 42a to 42d.

The brake pedal operation amount sensor 41 detects an operation amount Brkp of a brake pedal 93 as a brake operator and outputs a detection signal expressing the operation amount Brkp to the brake control ECU 40. Hereinafter, the operation amount Brkp will be referred to as "the brake pedal operation amount Brkp". The brake control ECU 40 is configured or programmed to acquire the brake pedal operation amount Brkp on the basis of the detection signal sent from the brake pedal operation amount sensor 41, calculate or acquire the requested acceleration Gj including the requested deceleration on the basis of the acquired brake pedal operation amount Brkp and store the calculated requested acceleration Gj in the RAM of the brake control ECU 40. It should be noted that the brake control ECU 40 may be configured or programmed to calculate the requested acceleration Gj on the basis of the own vehicle speed SPDj acquired as described later.

The vehicle wheel speed sensors 42a to 42d are provided on the respective vehicle wheels of the own vehicle 10. The vehicle wheel speed sensors 42a to 42d detect vehicle wheel rotation speeds ωa to ωd of the vehicle wheels, respectively and output detection signals expressing the vehicle wheel rotation speeds ωa to ωd, respectively to the brake control ECU 40.

The brake control ECU 40 is configured or programmed to acquire the vehicle wheel rotation speeds $\omega a$ to $\omega d$ on the basis of the detection signals and store the acquired vehicle wheel rotation speeds $\omega a$ to $\omega d$ in the RAM of the brake control ECU 40.

Further, the brake control ECU 40 is configured or programmed to calculate or acquire an average value $\omega ave$ of the acquired vehicle wheel rotation speeds $\omega a$ to $\omega d$ ($\omega ave = (\omega a + \omega b + \omega c + \omega d)/4$) and store the calculated average value $\omega ave$ as the own vehicle speed SPDj of the own vehicle 10 in the RAM of the brake control ECU 40. Hereinafter, the average value $\omega ave$ will be referred to as "the average vehicle wheel rotation speed $\omega ave$".

Alternatively, the brake control ECU 40 may be configured or programmed to acquire the own vehicle speed SPDj on the basis of a detection signal output from a sensor (not shown) configured to detect a rotation speed of a propeller shaft of the own vehicle 10 in place of acquiring the average vehicle wheel rotation speed $\omega ave$ as the own vehicle speed SPDj.

Further, the brake control ECU 40 is configured or programmed to calculate an amount of a change of the acquired own vehicle speed SPDj per minute unit time, that is, calculate a time derivative value of the own vehicle speed SPDj as an actual acceleration Gaj (=dSPDj/dt) and store the calculated actual acceleration Gaj in the RAM of the brake control ECU 40.

Further, a brake actuator 43 of a friction braking device or the like is electrically connected to the brake control ECU 40. The brake control ECU 40 is configured or programmed to activate the brake actuator 43 to generate friction braking forces at the vehicle wheels of the own vehicle 10, respectively such that the deceleration of the own vehicle 10 approaches the requested acceleration Gj corresponding to the requested deceleration when the requested acceleration Gj of the own vehicle 10 is a negative value, that is, when the deceleration of the own vehicle 10 is requested.

The vehicle control ECU 20, the engine control ECU 30 and the brake control ECU 40 cooperatively accelerate or decelerate the own vehicle 10. Therefore, these ECUs 20, 30 and 40 together constitute an acceleration/deceleration control device for controlling an acceleration of the own vehicle 10.

The steering control ECU 50 is known and is configured or programmed to acquire detection signals from sensors (not shown) configured to detect the various vehicle operation state amounts. Further, a steering actuator 53 such as a motor of an electric power steering device (not shown) is electrically connected to the steering control ECU 50.

The sensor ECU 60 is electrically connected to the own vehicle sensor 61. The own vehicle sensor 61 is a known millimeter wave radar sensor. The own vehicle sensor 61 outputs a millimeter wave (an output wave) ahead of the own vehicle 10. The millimeter wave is reflected by the preceding vehicle 11. The own vehicle sensor 61 receives this reflected millimeter wave.

The sensor ECU 60 is configured or programmed to detect the preceding vehicle 11 traveling immediately in front of the own vehicle 10 on the basis of the reflected millimeter wave received by the own vehicle sensor 61. Further, the sensor ECU 60 is configured or programmed to acquire a difference dSPD between the own vehicle speed SPDj and a traveling speed SPDs of the preceding vehicle 11 (i.e., a relative traveling speed dSPD between the own vehicle 10 and the preceding vehicle 11) (dSPD=SPDs−SPDj), an inter-vehicle distance D between the own vehicle 10 and the preceding vehicle 11 and a relative orientation of the preceding vehicle 11 with respect to the own vehicle 10 in a chronological manner each time a predetermined time elapses on the basis of a phase difference between the millimeter wave output from the own vehicle sensor 61 and the reflected millimeter wave received by the own vehicle sensor 61, a damping level of the reflected millimeter wave, a time until the reflected millimeter wave is received since the millimeter wave is output from the own vehicle sensor 61 and the like. The sensor ECU 60 stores the acquired relative speed dSPD, the inter-vehicle distance D, the relative orientation and the like in the RAM of the sensor ECU 60.

Therefore, the sensor ECU 60 constitutes an own vehicle sensor device that detects or acquires the preceding vehicle 11 on the basis of the reflected millimeter wave detected by the own vehicle sensor 61 and acquires the inter-vehicle distance D between the own vehicle 10 and the preceding vehicle 11 on the basis of the reflected millimeter wave detected by the own vehicle sensor 61.

The GPS device 70 is known and acquires a latitude and a longitude of a point where the own vehicle 10 travels on the basis of a GPS signal sent from an artificial satellite and stores the acquired latitude and longitude as a position of the own vehicle 10 in the RAM of the GPS device 70.

The wireless communication control ECU 80 is electrically connected to the wireless antenna 81 used for performing an inter-vehicle wireless communication. The wireless communication control ECU 80 is configured or programmed to receive communication information or communicating vehicle information including data, which identifies the communicating vehicles, sent from the communicating vehicles through wireless communication each time a predetermine time elapses and store the received data in the RAM of the wireless communication control ECU 80. Each of the communicating vehicles is different from the own vehicle and has a function that performs a wireless communication. The communicating vehicle information sent from each of the communicating vehicles includes data indicating operation state amounts of each of the communicating vehicles.

The data, which indicates the operation state amounts of each of the communicating vehicles and is received by the wireless communication control ECU 80 of the own vehicle 10 through the inter-vehicle wireless communication, includes data acquired by the vehicle control ECU 20, the engine control ECU 30, the brake control ECU 40 and the like of each of the communicating vehicles on the basis of detection signals output from various sensors of each of the communicating vehicles, data of states of the actuators of each of the communicating vehicles, to which the vehicle control ECU 20, the engine control ECU 30, the brake control ECU 40 and the like of each of the communicating vehicles send activation signals and the like.

In particular, the data sent from the communicating vehicle as communication data includes data (A) to (G) described below.

(A) A traveling speed SPDc of the communicating vehicle acquired by the brake control ECU 40 of the communicating vehicle. Hereinafter, this traveling speed SPDc will be referred to as "the communicating vehicle speed SPDc".

(B) A position of the communicating vehicle acquired by the GPS device 70 of the communicating vehicle.

(C) A requested acceleration Gc of the communicating vehicle calculated by the engine control ECU 30 of the communicating vehicle on the basis of the acceleration pedal operation amount Accp of the communicating vehicle when any of a cooperative following travel control or a CACC (Cooperative Adaptive Cruise Control) and an inter-vehicle distance control or an ACC (Adaptive Cruise Control) is not executed in the communicating vehicle.

(D) A requested acceleration Gc of the communicating vehicle corresponding to a requested deceleration of the communicating vehicle calculated by the brake control ECU 40 of the communicating vehicle on the basis of the brake pedal operation amount Brkp of the communicating vehicle when any of the cooperative following travel control and the inter-vehicle distance control is not executed in the communicating vehicle.

(E) A requested acceleration Gc of the communicating vehicle calculated by the vehicle control ECU 20 of the communicating vehicle on the basis of the requested acceleration Gss of a vehicle traveling immediately in front of the communicating vehicle in order to cause the communicating vehicle to travel following the vehicle traveling immediately in front of the communicating vehicle when any of the cooperative following travel control and the inter-vehicle distance control is executed in the communicating vehicle.

(F) An actual acceleration Gac of the communicating vehicle acquired by the brake control ECU 40 of the communicating vehicle on the basis of the average vehicle wheel speed ωave of the communicating vehicle.

Further, the wireless communication control ECU 80 is configured or programmed to send or output communication information (own vehicle information) including the above-described data indicating the operation state amounts of the own vehicle 10 to the outside of the own vehicle 10 each time a predetermined time elapses.

<Summary of Cooperative Following Travel Control>

Below, a summary of the cooperative following travel control or the CACC executed by the embodiment control apparatus will be described. The embodiment control apparatus starts an execution of the cooperative following travel control when the CACC switch 21 is positioned at the ON-position by the occupant, in particular, the driver of the own vehicle 10. It should be noted that the vehicle control ECU 20 is configured or programmed to control operations of the engine actuators 32 on the basis of the acceleration pedal operation amount Accp, the engine speed NE and the like when the CACC switch 21 is positioned at the OFF-position. In addition, the brake control ECU 40 is configured or programmed to control an operation of the brake actuator 43 on the basis of the brake pedal operation amount Brkp and the own vehicle speed SPDj or the vehicle wheel rotation speeds ωa to ωd of the vehicle wheels when the CACC switch 21 is positioned at the OFF-position.

When the vehicle control ECU 20 starts the execution of the cooperative following travel control, the vehicle control ECU 20 starts an execution of a process that identifies a communicating vehicle detected or acquired by the own vehicle sensor 61 among the communicating vehicles, which sends data to the own vehicle 10, as a communicating preceding vehicle on the basis of data acquired by the own vehicle sensor 61 and the sensor ECU 60 and data acquired by the wireless antenna 81 and the wireless communication control ECU 80.

For example, the vehicle control ECU 20 estimates a traveling speed of a candidate vehicle, which is a candidate of the communicating vehicle to be identified as the communicating preceding vehicle 11, on the basis of the relative vehicle speed dSPD and the own vehicle speed SPDj acquired by the sensor ECU 60. When a degree of a similarity between the estimated traveling speed of the candidate vehicle and the traveling speed of the candidate vehicle sent from the candidate vehicle through the wireless communication is high, the vehicle control ECU 20 identifies that candidate vehicle as the communicating preceding vehicle 11. For example, a method described in JP 5522193 B can be used as a method for identifying the communicating preceding vehicle 11.

Further, in this embodiment, a target value Ttgt of a value T obtained by dividing the inter-vehicle distance D by the own vehicle speed SPDj (T=D/SPDj), is previously set. Hereinafter, the value Ttgt will be referred to as "the target inter-vehicle time Ttgt". The target inter-vehicle time Ttgt is set to a predetermined constant value. In this regard, the target inter-vehicle time Ttgt may be variably set by a switch (not shown) operated by the driver of the own vehicle 10.

<Feedback Control>

The embodiment control apparatus controls the acceleration including the deceleration of the own vehicle 10 such that a value T obtained by dividing the actual inter-vehicle distance D by the actual own vehicle speed SPDj corresponds to the target inter-vehicle time Ttgt when the CACC switch 21 is set at the ON-position by the driver of the own vehicle 10. Hereinafter, the value T will be referred to as "the inter-vehicle time T".

For example, when the communicating preceding vehicle 11 accelerates under the condition that the inter-vehicle time T corresponds to the target inter-vehicle time Ttgt and the own vehicle speed SPDj is constant, the inter-vehicle distance D increases. As a result, the inter-vehicle time T becomes larger than the target inter-vehicle time Ttgt and thus, the embodiment control apparatus accelerates the own vehicle 10 to decrease the inter-vehicle time T.

On the other hand, when the communicating preceding vehicle 11 decelerates under the condition that the inter-vehicle time T corresponds to the target inter-vehicle time Ttgt and the own vehicle speed SPDj is constant, the inter-vehicle distance D decreases. As a result, the inter-vehicle time T becomes smaller than the target inter-vehicle time Ttgt and thus, the embodiment control apparatus decelerates the own vehicle 10 to increase the inter-vehicle time T.

When the embodiment control apparatus accelerates or decelerates the own vehicle 10, the embodiment control apparatus calculates or sets a requested acceleration Gj of the own vehicle 10 as described below and controls the engine control ECU 30 to cause the engine control ECU 30 to control the operation of the engine actuators 32 of the engine or controls the brake control ECU 40 to cause the brake control ECU 40 to control the operation of the brake actuator 43 of the braking device such that the requested acceleration Gj is achieved, that is, such that the acceleration of the own vehicle 10 corresponds to the requested acceleration Gj. The requested acceleration Gj can be any of a positive value for accelerating the own vehicle 10 and a negative value for decelerating the own vehicle 10. Thereby, the requested acceleration Gj can be referred to as a requested acceleration/deceleration Gj.

The embodiment control apparatus multiplies the target inter-vehicle time Ttgt by the actual own vehicle speed SPDj to calculate or acquire a target inter-vehicle distance Dtgt (=Ttgt×SPDj). In this embodiment, the target inter-vehicle time Ttgt is set to a constant value and thus, the calculated target inter-vehicle distance Dtgt increases as the actual own vehicle speed SPDj increases.

Further, the embodiment control apparatus calculates or acquires a difference dD of the target inter-vehicle distance Dtgt with respect to the actual inter-vehicle distance D (dD=D−Dtgt). Hereinafter, the difference dD will be referred to as "the inter-vehicle distance difference dD". The calculated inter-vehicle distance difference dD is a positive value when the actual inter-vehicle distance D is larger than the target inter-vehicle distance Dtgt.

In addition, the embodiment control apparatus acquires the relative traveling speed dSPD detected by the own vehicle sensor 61. The acquired relative traveling speed dSPD is a positive value when the traveling speed SPDs of the communicating preceding vehicle 11 is larger than the own vehicle speed SPDj. Hereinafter, the traveling speed SPDs will be referred to as "the preceding vehicle speed SPDs".

Then, the embodiment control apparatus calculates or acquires a total value of a value obtained by multiplying the inter-vehicle distance difference dD by a correction coefficient KFB1 and a value obtained by the relative traveling speed dSPD by a correction coefficient KFB2 as a determination-used calculation value P (=dD×KFB1+dSPD×KFB2). The correction coefficients KFB1 and KFB2 are set to positive constant values larger than zero, respectively.

When the determination-used calculation value P is a positive value, it can be determined that the acceleration of the own vehicle 10 is needed in order to maintain or control the inter-vehicle time T at or to the target inter-vehicle time Ttgt, that is, in order to maintain or control the inter-vehicle distance D at or to the target inter-vehicle distance Dtgt.

In this case, the embodiment control apparatus calculates or acquires a feedback requested acceleration GFB by multiplying the determination-used calculation value P by a correction coefficient KFB3 (GFB=(dD×KFB1+dSPD×KFB2)×KFB3). The correction coefficient KFB3 is a positive value larger than zero and equal to or smaller than one and decreases as the own vehicle speed SPDj increases. Therefore, when the acceleration of the own vehicle 10 is needed, the calculated feedback requested acceleration GFB is a positive value.

On the other hand, when the determination-used calculation value P is a negative value, it can be determined that the deceleration of the own vehicle 10 is needed in order to maintain or control the inter-vehicle time T at or to the target inter-vehicle time Ttgt, that is, in order to maintain or control the inter-vehicle distance D at or to the target inter-vehicle distance Dtgt. In this case, the embodiment control apparatus acquires the determination-used calculation value P as the feedback requested acceleration GFB (=dD×KFB1+dSPD×KFB2). Therefore, when the deceleration of the own vehicle 10 is needed, the acquired feedback requested acceleration GFB is a negative value.

The embodiment control apparatus can control the inter-vehicle time T to the target inter-vehicle time Ttgt by accelerating or decelerating the own vehicle 10 such that the feedback requested acceleration GFB is achieved. In this regard, the inter-vehicle distance D and the relative traveling speed dSPD acquired by the sensor ECU 60 varies, for example, after the communicating preceding vehicle 11 starts to accelerate or decelerate. Therefore, if the acceleration or deceleration of the own vehicle 10 is controlled only using the feedback requested acceleration GFB, the start timing of the acceleration or deceleration of the own vehicle 10 delays with respect to the start timing of the acceleration or deceleration of the communicating preceding vehicle 11.

<Feedforward Control>

Accordingly, the embodiment control apparatus predicts the start of the acceleration or deceleration of the communicating preceding vehicle 11 on the basis of preceding vehicle acceleration information on the acceleration of the communicating preceding vehicle 11 acquired by the wireless communication control ECU 80 and controls the acceleration of the own vehicle 10 on the basis of the result of the prediction.

In particular, the embodiment control apparatus calculates or estimates or acquires the acceleration Ges of the communicating preceding vehicle 11 on the basis of a value fh(Gs) obtained by filtering the requested acceleration Gs of the communicating preceding vehicle 11 with a high-pass filter and a value hl(Gas) obtained by filtering the actual acceleration Gas of the communicating preceding vehicle 11 with a low-pass filter when the requested acceleration Gs and the actual acceleration Gas of the communicating preceding vehicle 11 have been acquired by the wireless communication control ECU 80. Hereinafter, the estimated acceleration Ges of the communicating preceding vehicle 11 will be simply referred to as "the estimated acceleration Ges".

Alternatively, the embodiment control apparatus acquires or estimates the actual acceleration Gas of the communicating preceding vehicle 11 as the estimated acceleration Ges of the communicating preceding vehicle 11 when only the actual acceleration Gas of the communicating preceding vehicle 11 is acquired by the wireless communication control ECU 80.

When the acceleration of the communicating preceding vehicle 11 is predicted, the calculated or acquired estimated acceleration Ges is a positive value. On the other hand, when the deceleration of the communicating preceding vehicle 11 is predicted, the calculated or acquired estimated acceleration Ges is a negative value.

The embodiment control apparatus calculates or acquires a value obtained by multiplying the calculated or acquired estimated acceleration Ges by a coefficient smaller than one as a feedforward requested acceleration GFF. When the acceleration of the communicating preceding vehicle 11 is predicted, the calculated feedforward requested acceleration GFF is a positive value. On the other hand, when the deceleration of the communicating preceding vehicle 11 is predicted, the calculated feedforward requested acceleration GFF is a negative value.

The embodiment control apparatus calculates or acquires a conclusive requested acceleration Gj of the own vehicle 10 by adding the feedforward requested acceleration GFF to the feedback requested acceleration GFB (Gj=GFF+GFB) and controls the operations of the engine actuators 32 of the engine or the operation of the brake actuator 43 of the braking device such that the calculated requested acceleration Gj is achieved. When the own vehicle 10 should be accelerated, the calculated requested acceleration Gj is a positive value. On the other hand, when the own vehicle 10 should be decelerated, the calculated requested acceleration Gj is a negative value.

It should be noted that the conclusive requested acceleration Gj of the own vehicle 10 which is an acceleration obtained by adding the feedforward requested acceleration GFF to the feedback requested acceleration GFB will be referred to as "the CACC requested G" in some cases. The CACC corresponding to the cooperative following travel control is a control that causes the acceleration of the own vehicle 10 to correspond to the CACC requested G. The ACC corresponding to the inter-vehicle distance control is a control that causes the acceleration of the own vehicle 10 to correspond to the conclusive requested acceleration Gj corresponding to the feedback requested acceleration GFB without using the feedforward requested acceleration GFF.

The cooperative following travel control can accelerate or decelerate the own vehicle 10 while predicting the acceleration or deceleration of the communicating preceding vehicle 11. Therefore, the inter-vehicle time T can be controlled to the target inter-vehicle time Ttgt with a high following property. In other words, the own vehicle 10 can be traveled accurately following the communicating preceding vehicle 11.

When a guardrail is provided at the side of a road, on which the own vehicle 10 travels, the own vehicle sensor 61 receives the wave reflected by the guardrail. In this case, the own vehicle sensor 61 receives the waves reflected by the preceding vehicle 11 and the guardrail, simultaneously. Thus, the temporal state that the sensor ECU 60 has not detected or trapped the preceding vehicle 11 may occur. In addition, when a height of the preceding vehicle 11 is large and the inter-vehicle distance between the own vehicle 10 and the preceding vehicle 11 is small, the output wave passes under the preceding vehicle 11 and thus, the own vehicle sensor 61 may not receive the reflected wave. Also, in this case, the temporal state that the sensor ECU 60 has not detected the preceding vehicle 11 may occur.

Furthermore, when the preceding vehicle 11 exists and the sensor ECU 60 has not detected the preceding vehicle 11, the preceding vehicle acceleration information is continued to be transmitted from the vehicle, which has been already identified as the communicating preceding vehicle 11, to the own vehicle 10. Therefore, the embodiment control apparatus can calculate the feedforward requested acceleration GFF on the basis of the communicating preceding vehicle acceleration information and the own vehicle 10 may be accelerated due to the calculated feedforward requested acceleration GFF. In this case, under the state that the sensor ECU 60 has not detected the preceding vehicle 11 and as a result, has not acquired the inter-vehicle distance D, the own vehicle 10 is accelerated and thus, the excessive decrease of the inter-vehicle distance between the own vehicle 10 and the preceding vehicle 11 or between the own vehicle 10 and a vehicle coming between the own vehicle 10 and the preceding vehicle 11 may occur.

Accordingly, the embodiment control apparatus sets the feedforward requested acceleration GFF to zero when it is determined that the sensor ECU 60 has not detected the preceding vehicle 11 and the calculated feedforward requested acceleration GFF is larger than zero. In other words, the embodiment control apparatus sets an upper limit of the feedforward requested acceleration GFF to zero. That is, the embodiment control apparatus limits the feedforward requested acceleration GFF to a value equal to or smaller than zero.

Thereby, when it is determined that the sensor ECU 60 has not detected the preceding vehicle 11, the acceleration of the own vehicle 10 derived from the feedforward requested acceleration GFF is prevented. As a result, the excessive decrease of the inter-vehicle distance is prevented.

When it is determined that the sensor ECU 60 has not detected the preceding vehicle 11 and the calculated feedforward requested acceleration GFF is smaller than zero, the embodiment control apparatus uses the calculated feedforward requested acceleration GFF as is to set the requested acceleration Gj of the own vehicle 10. In this case, the own vehicle 10 is decelerated, thereby to increase the inter-vehicle distance D and therefore, the inter-vehicle distance D is prevented from decreasing excessively and the passengers of the own vehicle 10 is prevented from feeling discomfort. Further, when the temporal state that the sensor ECU 60 has not detected the preceding vehicle 11 occurs, the following travel control can be restarted smoothly after the sensor ECU 60 restarts the detection of the preceding vehicle 11.

<Actual Operation>

Next, the cooperative following travel control (the CACC) executed by the embodiment control apparatus will be concretely described. The CPU of the vehicle control ECU 20 is programmed or configured to start an execution of a routine shown by a flowchart in FIG. 2 each time a predetermined time elapses. Therefore, at a predetermined timing, the CPU starts the execution of this routine from a step 200 and then, proceeds with the process to a step 205 to determine whether or not the CACC switch 21 is positioned at the ON-position.

Figure 2:
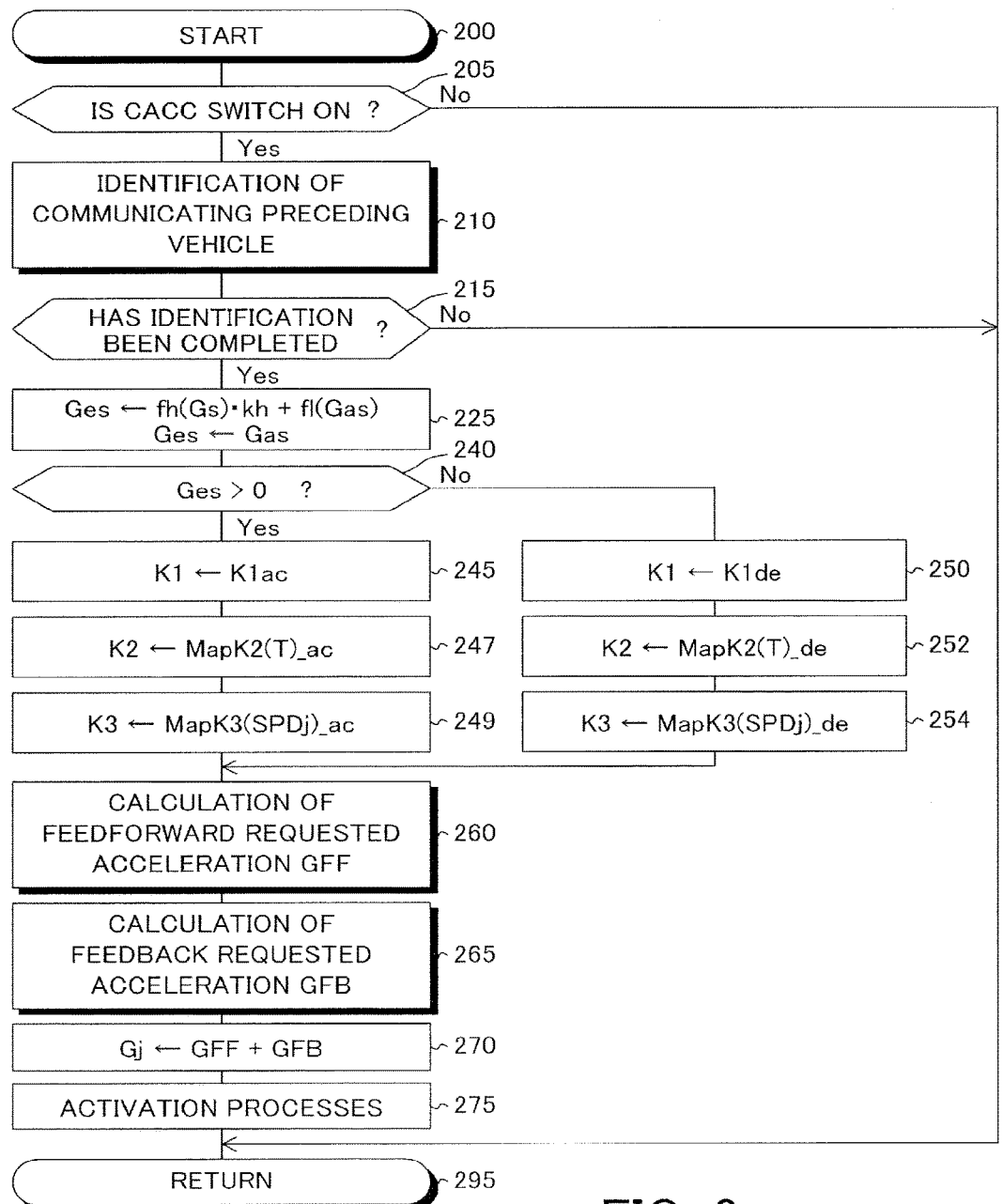
FIG. 2 is a view for showing a flowchart of a routine executed by a CPU of a vehicle control ECU shown in FIG. 1.
Figure 3:
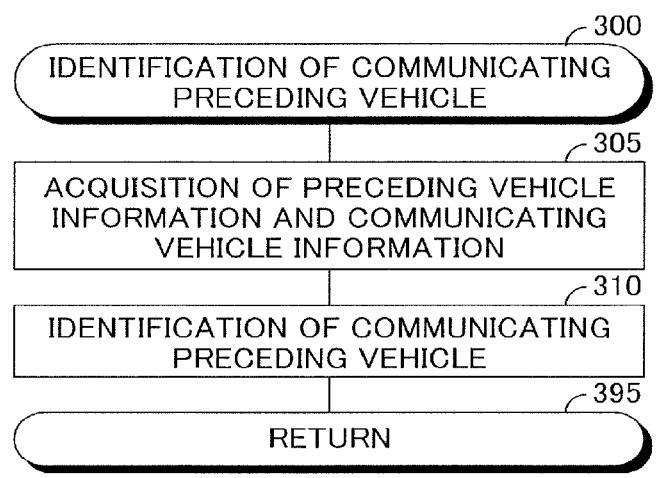
FIG. 3 is a view for showing a flowchart of a routine executed by the CPU.

When the CACC switch 21 is positioned at the ON-position, the CPU determines "Yes" at the step 205 and then, proceeds with the process to a step 210 to start an execution of a routine shown by a flowchart in FIG. 3 to identify the communicating preceding vehicle 11 among the communicating vehicles which send information including data of operation state amounts to the own vehicle 10 through the wireless communication. That is, when the CPU proceeds with the process to the step 210, the CPU starts the execution of the routine from a step 300 of FIG. 3 and then, sequentially executes processes of steps 305 and 310 described below. Then, the CPU proceeds with the process to a step 215 of FIG. 2 via a step 395.

Step 305: The CPU acquires the preceding vehicle information including the data of the operation state amounts of the preceding vehicle from the sensor ECU 60 and acquires the communicating vehicle information including the data of the operation state amounts of the communicating vehicles from the wireless communication control ECU 80.

Step 310: The CPU identifies the communicating preceding vehicle 11 among the communicating vehicles on the basis of the operation state amounts of the communicating vehicles included in the communicating vehicle information and the operation state amounts of the preceding vehicle 11 included in the preceding vehicle information. For example, the CPU calculates or estimates the traveling speed of the preceding vehicle 11 on the basis of the relative traveling speed dSPD acquired by the own vehicle sensor 61 and the own vehicle speed SPDj. Then, when the degree of the similarity between the calculated traveling speed of the preceding vehicle 11 and the traveling speed of the communicating vehicle sent from the communicating vehicle through the wireless communication is large, the CPU identifies that communicating vehicle as the communicating preceding vehicle 11.

It should be noted that after a particular communicating vehicle is identified as the communicating preceding vehicle 11 by the execution of the process of the step 310 once, the identified communicating vehicle is employed as the communicating preceding vehicle 11 until the CPU determines that the identified communicating vehicle is not the preceding vehicle.

When the CPU proceeds with the process to the step 215, the CPU determines whether or not the identification of the communicating preceding vehicle 11 has been completed at the step 210. When the identification of the communicating preceding vehicle 11 has been completed, the CPU determines "Yes" at the step 215 and then, executes a process of a step 225 described below.

Step 225: The CPU calculates or acquires, as the estimated acceleration Ges (=fh(Gs)+fl(Gas)), a total value of a value obtained by multiplying a value fh(Gs) obtained by filtering the requested acceleration Gs of the communicating preceding vehicle 11 with the high-pass filter by a predetermined positive coefficient kh (in this embodiment, the coefficient kh is one) and a value fl(Gas) obtained by filtering the actual acceleration Gas of the communicating preceding vehicle 11 with the low-pass filter when the requested acceleration Gs and the actual acceleration Gas are included in the communicating vehicle information acquired at the step 210 (in particular, the step 305 of FIG. 3) and relating to the communicating vehicle identified as the communicating preceding vehicle 11 at the step 210 (in particular, at the step 310 of FIG. 3). Hereinafter, the communicating vehicle information will be referred to as "the communicating preceding vehicle information" in some cases.

Alternatively, the CPU employs the actual acceleration Gas as the estimated acceleration Ges when no requested acceleration Gs is included in the communicating preceding vehicle information and only the actual acceleration Gas is included in the communicating preceding vehicle information.

Next, the CPU proceeds with the process to a step 240 to determine whether or not the estimated acceleration Ges calculated or acquired at the step 225 is larger than zero. When the estimated acceleration Ges is larger than zero, the CPU determines "Yes" at the step 240 and then, sequentially executes processes of steps 245 to 249 described below. Then, the CPU proceeds with the process to a step 260.

Step 245: The CPU sets a first correction coefficient Klac for the acceleration as the first correction coefficient K1. The first correction coefficient Klac for the acceleration is a constant value smaller than one. In this regard, the first correction coefficient Klac for the acceleration may be one.

Figure 6A:
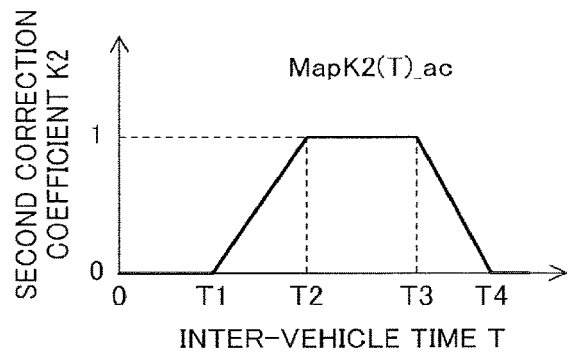
FIG. 6(A) is a view for showing a look-up table used for acquiring a second correction coefficient for an acceleration on the basis of an inter-vehicle time.

Step 247: The CPU applies the inter-vehicle time T to a look-up table MapK2(T)_ac shown in FIG. 6(A) to acquire the second correction coefficient K2 for the acceleration. According to the look-up table MapK2(T)_ac, when the inter-vehicle time T is between zero and a time T1, the second correction coefficient K2 for the acceleration is zero. When the inter-vehicle time T is between the time T1 and a time T2, the second correction coefficient K2 for the acceleration is a value equal to or smaller than one and increases as the inter-vehicle time T increases. When the inter-vehicle time T is between the time T2 and a time T3, the second correction coefficient K2 for the acceleration is one. When the inter-vehicle time T is between the time T3 and a time T4, the second correction coefficient K2 for the acceleration is a value equal to or smaller than one and decreases as the inter-vehicle time T increases. When the inter-vehicle time T is larger than the time T4, the second correction coefficient K2 for the acceleration is zero.

Figure 6B:
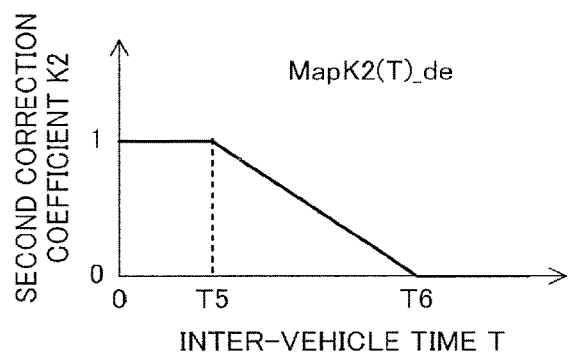
FIG. 6(B) is a view for showing a look-up table used for acquiring a second correction coefficient for a deceleration on the basis of the inter-vehicle time.
Figure 6C:
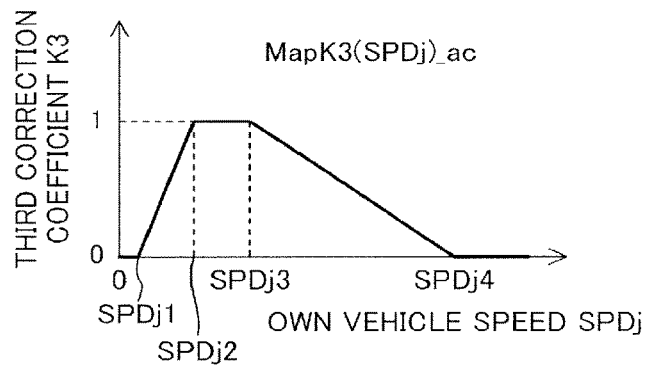
FIG. 6(C) is a view for showing a look-up table used for acquiring a third correction coefficient for an acceleration on the basis of a speed of an own vehicle.

Step 249: The CPU applies the own vehicle speed SPDj to a look-up table MapK3(SPDj)_ac shown in FIG. 6(C) to acquire the third correction coefficient K3 for the acceleration. According to the look-up table MapK3(SPDj)_ac, when the own vehicle speed SPDj is between zero and a vehicle speed SPDj1, the third correction coefficient K3 for the acceleration is zero. When the own vehicle speed SPDj is between the vehicle speed SPDj1 and a vehicle speed SPDj2, the third correction coefficient K3 for the acceleration is equal to or smaller than one and increases as the own vehicle speed SPDj increases. When the own vehicle speed SPDj is between the vehicle speed SPDj2 and a vehicle speed SPDj3, the third correction coefficient K3 for the acceleration is one. When the own vehicle speed SPDj is between the vehicle speed SPDj3 and a vehicle speed SPDj4, the third correction coefficient K3 for the acceleration is equal to or smaller than one and decreases as the own vehicle speed SPDj increases. When the own vehicle speed SPDj is larger than the vehicle speed SPDj4, the third correction coefficient K3 for the acceleration is zero.

When the estimated acceleration Ges is equal to or smaller than zero upon the execution of the process of the step 240, the CPU determines "No" at the step 240 and then, sequentially executes processes of steps 250 to 254 described below. Then, the CPU proceeds with the process to the step 260.

Step 250: The CPU sets a first correction coefficient Klde for the deceleration as the first correction coefficient K1. The first correction coefficient Klde for the deceleration is a constant value smaller than one and equal to or larger than the first correction coefficient Klac for the acceleration. In this regard, the first correction coefficient Klde for the deceleration may be one.

Step 252: The CPU applies the inter-vehicle time T to a look-up table MapK2(T)_de shown in FIG. 6(B) to acquire the second correction coefficient K2 for the deceleration. According to the look-up table MapK2(T)_de, when the inter-vehicle time T is between zero and a time T5, the second correction coefficient K2 for the deceleration is one. When the inter-vehicle time T is between the time T5 and a time T6, the second correction coefficient K2 for the deceleration is equal to or smaller than one and decreases as the inter-vehicle time T increases. When the inter-vehicle time T is larger than the time T6, the second correction coefficient K2 for the deceleration is zero.

Figure 6D:
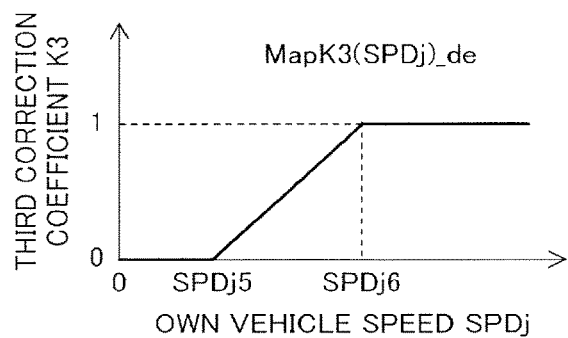
FIG. 6(D) is a view for showing a look-up table used for acquiring a third correction coefficient for a deceleration on the basis of the speed of the own vehicle.

Step 254: The CPU applies the own vehicle speed SPDj to a look-up table MapK3(SPDj)_de shown in FIG. 6(D) to acquire the third correction coefficient K3 for the deceleration. According to the look-up table MapK3(SPDj)_de, when the own vehicle speed SPDj is between zero and a vehicle speed SPDj5, the third correction coefficient K3 for the deceleration is zero. When the own vehicle speed SPDj is between the vehicle speed SPDj5 and a vehicle speed SPDj6, the third correction coefficient K3 for the deceleration is equal to or smaller than one and increases as the own vehicle speed SPDj increases. When the own vehicle speed SPDj is larger than the vehicle speed SPDj6, the third correction coefficient K3 for the deceleration is equal to or smaller than one and increases as the own vehicle speed SPDj increases.

Figure 4:
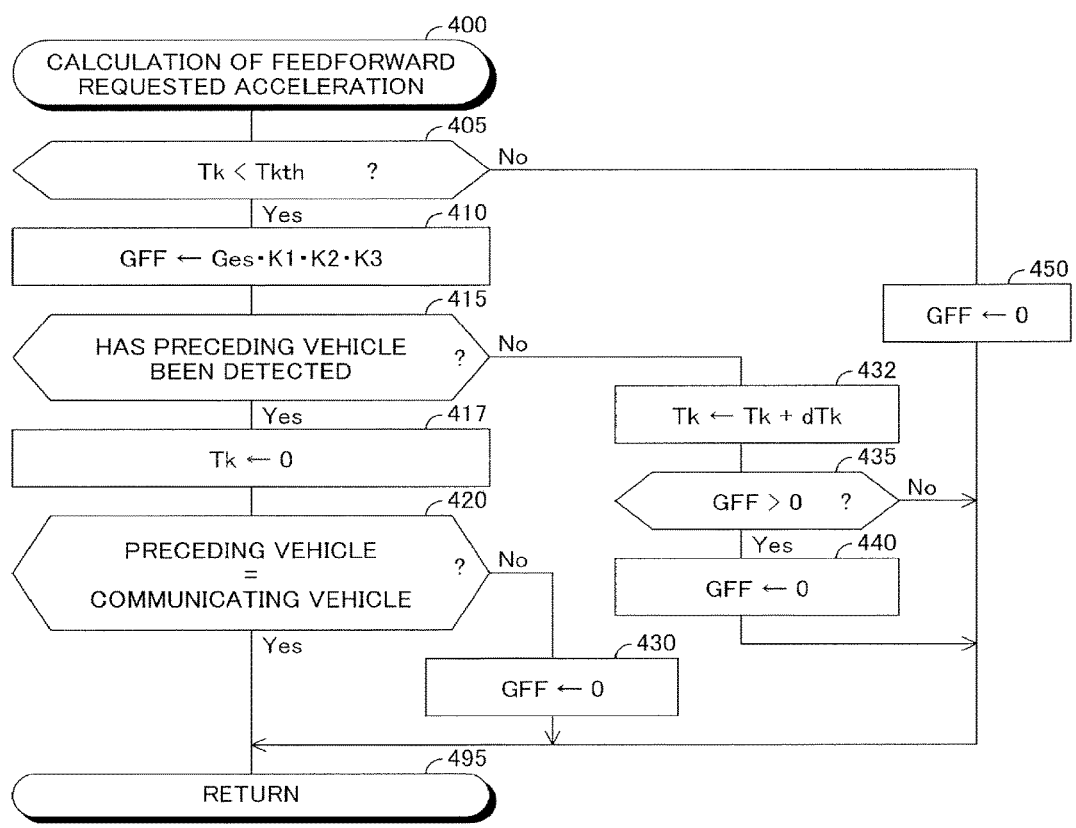
FIG. 4 is a view for showing a flowchart of a routine executed by the CPU.

When the CPU proceeds with the process to the step 260, the CPU starts an execution of a feedforward requested acceleration calculation routine shown by a flowchart in FIG. 4 to calculate the feedforward requested acceleration GFF. Therefore, when the CPU proceeds with the process to the step 260, the CPU starts the execution of the routine from a step 400 of FIG. 4 and then, proceeds with the process to a step 405 to determine whether or not an elapsed time Tk, which represents a time elapsing since the sensor ECU 60 has not detected the preceding vehicle, is smaller than a predetermined time Tkth (in this embodiment, one second). In this regard, when the sensor ECU 60 detects the preceding vehicle, the elapsed time Tk is set to zero.

When the elapsed time Tk is smaller than the predetermined time Tkth, the CPU determines "Yes" at the step 405 and then, proceeds with the process to a step 410 to calculate or acquire the feedforward requested acceleration GFF in accordance with a following expression (1).

$$GFF = Ges \times K1 \times K2 \times K3 \qquad (1)$$

In the expression (1), the symbol "Ges" is the estimated acceleration calculated or acquired at the step 225 of FIG. 2, the symbol "K1" is the first correction value set at the step 245 or 250, the symbol "K2" is the second correction value set at the step 247 or 252 and the symbol "K3" is the third correction value set at the step 249 or 254.

Next, the CPU proceeds with the process to a step 415 to determine whether or not the sensor ECU 60 has detected the preceding vehicle. The sensor ECU 60 sends a signal, which represents whether or not the sensor ECU 60 has detected the preceding vehicle, to the vehicle control ECU 20. The CPU executes the determination process of the step 415 on the basis of the signal set from the sensor ECU 60. When the sensor ECU 60 has not detected the preceding vehicle, the CPU determines "No" at the step 415 and then, proceeds with the process to a step 432 to increase the elapsed time Tk by a predetermined value dTk.

Next, the CPU proceeds with the process to a step 435 to determine whether or not the feedforward requested acceleration GFF calculated at the step 410 is larger than zero. When the feedforward requested acceleration GFF is larger than zero, the CPU determines "Yes" at the step 435 and then, proceeds with the process to a step 440 to set the feedforward requested acceleration GFF to zero. Then, the CPU proceeds with the process to a step 265 of FIG. 2 via a step 495.

On the other hand, when the feedforward requested acceleration GFF is equal to or smaller than zero upon the execution of the process of the step 435, the CPU determines "No" at the step 435 and then, proceeds with the process directly to the step 265 of FIG. 2 via the step 495. As a result, the feedforward requested acceleration GFF is limited to a value equal to or smaller than zero when the sensor ECU 60 has not detected the preceding vehicle.

On the other hand, when the sensor ECU 60 has detected the preceding vehicle upon the execution of the process of the step 415, the CPU determines "Yes" at the step 415 and then, proceeds with the process to a step 417 to clear the elapsed time Tk.

Next, the CPU proceeds with the process to a step 420 to determine whether or not the preceding vehicle determined to be detected at the step 415 corresponds to a vehicle realized by the wireless communication control ECU 80 as the communicating vehicle.

When the preceding vehicle determined to have been detected upon the execution of the process of the step 420 corresponds to the communicating vehicle, that is, the communicating vehicle is the preceding vehicle, the CPU proceeds with the process to the step 265 of FIG. 2 via the step 495. In this case, the feedforward requested acceleration GFF has been set to a value calculated at the step 410.

On the other hand, when the preceding vehicle, which has been detected upon the execution of the process of the step 420, does not correspond to the communicating vehicle, the CPU determines "No" at the step 420 and then, proceeds with the process to a step 430 to set the feedforward requested acceleration GFF to zero. That is, when the communicating vehicle, which has been realized as the communicating preceding vehicle 11 at present, is not the preceding vehicle, the communicating vehicle may not be the communicating preceding vehicle 11 and accordingly, the CPU sets the feedforward requested acceleration GFF to zero. Then, the CPU proceeds with the process to the step 265 of FIG. 2 via the step 495. In this case, the inter-vehicle distance control, which is a feedback control, is executed in accordance with the requested acceleration Gj (=GFB) calculated on the basis of the feedback requested acceleration GFB only.

When the elapsed time Tk is equal to or larger than the predetermined time Tkth upon the execution of the process of the step 405, the CPU determines "No" at the step 405 and then, proceeds with the process to a step 450 to set the feedforward requested acceleration GFF to zero. Then, the CPU proceeds with the process to the step 265 of FIG. 2 via the step 495. In this case, as described later, the feedback requested acceleration GFB is set to zero (see a step 570 of FIG. 5) and therefore, the cooperative following travel control and the inter-vehicle distance control are stopped.

Figure 5:
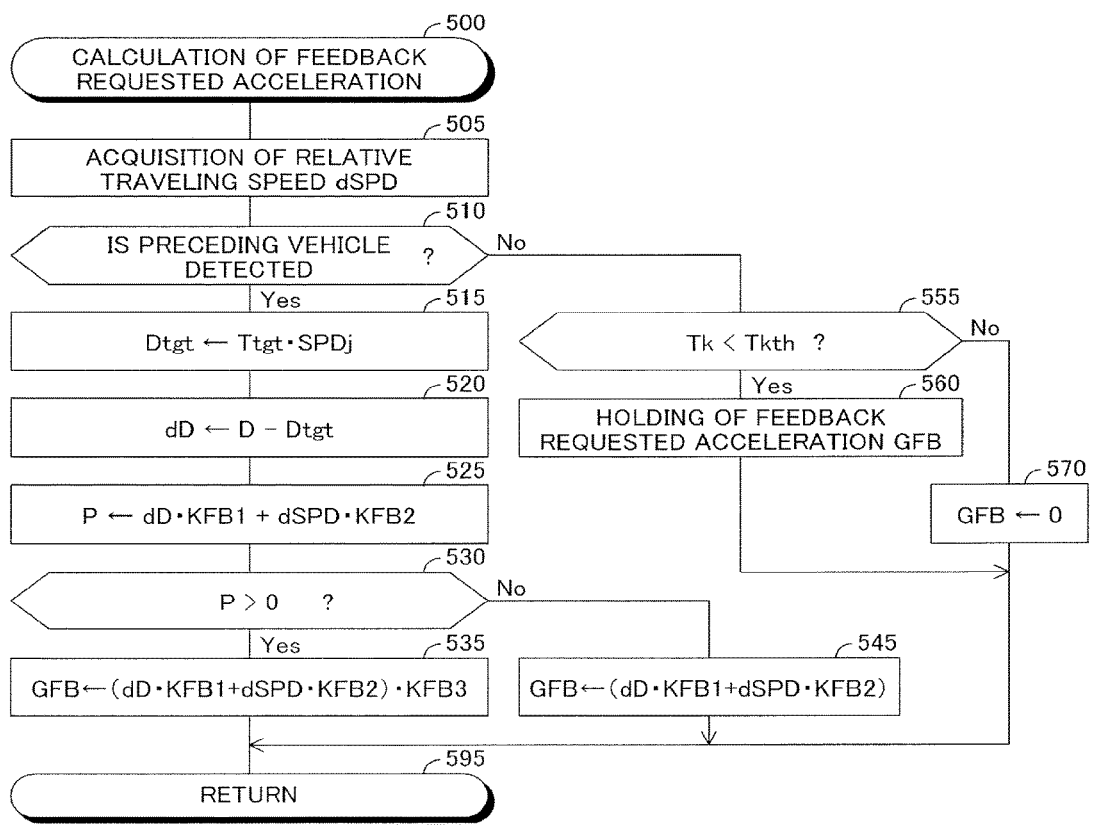
FIG. 5 is a view for showing a flowchart of a routine executed by the CPU.

When the CPU proceeds with the process to the step 265, the CPU executes a feedback requested acceleration calculation routine shown by a flowchart in FIG. 5 to calculate the feedback requested acceleration GFB. That is, when the CPU proceeds with the process to the step 265, the CPU starts an execution of the routine from a step 500 of FIG. 5 and then, proceeds with the process to a step 505 to acquire the relative traveling speed dSPD. Then, the CPU proceeds with the process to a step 510 to determine whether or not the sensor ECU 60 has detected the communicating preceding vehicle 11.

When the sensor ECU 60 has detected the communicating preceding vehicle 11, the CPU determines "Yes" at the step 510 and then, sequentially executes processes of steps 515 to 525 described below.

Step 515: The CPU calculates or acquires the target inter-vehicle distance Dtgt by multiplying the target inter-vehicle time Ttgt by the own vehicle speed SPDj (Dtgt=Ttgt×SPDj). As described above, the target inter-vehicle time Ttgt is set to a constant value.

Step 520: The CPU calculates or acquires the inter-vehicle distance difference dD by subtracting the target inter-vehicle distance Dtgt from the inter-vehicle distance D (dD=D−Dtgt).

Step 525: The CPU calculates or acquires the determination-used calculation value P in accordance with a following expression (2).

$$P = dD \times KFB1 + dSPD \times KFB2 \tag{2}$$

In the expression (2), the symbol "dD" is the inter-vehicle distance difference calculated at the step 520, the symbol "dSPD" is the relative traveling speed between the own vehicle 10 and the preceding vehicle and the symbols "KFB1" and "KFB2" are correction coefficients, respectively, which are positive constant values larger than zero.

Then, the CPU proceeds with the process to a step 530 to determine whether or not the determination-used calculation value P is larger than zero. The determination-used calculation value P larger than zero indicates that the acceleration request due to the inter-vehicle distance D occurs in the own vehicle 10 and the determination-used calculation value P equal to or smaller than zero indicates that no acceleration request due to the inter-vehicle distance D occurs in the own vehicle 10.

When the determination-used calculation value P is larger than zero, the CPU determines "Yes" at the step 530 and then, proceeds with the process to a step 535 to calculate or acquire the feedback requested acceleration GFB in accordance with a following expression (3). Then, the CPU proceeds with the process to a step 270 of FIG. 2 via a step 595.

$$GFB = (dD \times KFB1 + dSPD \times KFB2) \times KFB3 \tag{3}$$

In the expression (3), the symbol "KFB3" is a correction coefficient which is a positive value larger than zero and smaller than one and decreases as the own vehicle speed SPDj increases.

On the other hand, when the determination-used calculation value P is equal to or smaller than zero upon the execution of the process of the step 530, the CPU determines "No" at the step 530 and then, proceeds with the process to a step 545 to calculate or acquire the feedback requested acceleration GFB in accordance with a following expression (4). Then, the CPU proceeds with the process to the step 270 of FIG. 2 via the step 595.

$$GFB = dD \times KFB1 + dSPD \times KFB2 \qquad (4)$$

On the other hand, when the sensor ECU 60 has not detected the preceding vehicle (i.e., the communicating preceding vehicle 11) upon the execution of the process of the step 510, the CPU determines "No" at the step 510 and then, proceeds with the process to a step 555 to determine whether or not the time elapsing Tk since the sensor ECU 60 does not detect the preceding vehicle is smaller than the predetermined Tkth (in this embodiment, one second).

When the elapsed time Tk is smaller than the predetermined time Tkth, the CPU determines "Yes" at the step 555 and then, executes a process of a step 560 described below. Then, the CPU proceeds with the process to the step 270 of FIG. 2 via the step 595.

Step 560: The CPU holds the presently-set feedback requested acceleration GFB. That is, the feedback requested acceleration GFB is maintained at a value of the feedback requested acceleration GFB set immediately before the sensor ECU 60 does not detect the preceding vehicle (i.e., the communicating preceding vehicle 11).

On the other hand, when the elapsed time Tk is equal to or larger than the predetermined time Tkth upon the execution of the process of the step 555, the CPU determines "No" at the step 555 and then, executes a process of a step 570 described below. Then, the CPU proceeds with the process to the step 270 of FIG. 2 via the step 595.

Step 570: The CPU sets the feedback requested acceleration GFB to zero. In this case, the feedforward requested acceleration GFF is also set to zero at the step 450 of FIG. 4 and thus, the cooperative following travel control and the inter-vehicle distance control are stopped.

When the CPU proceeds with the process to the step 270 of FIG. 2, the CPU calculates or acquires the requested acceleration Gj of the own vehicle 10 by adding the feedback requested acceleration GFB calculated at the step 265 to the feedforward requested acceleration GFF calculated at the step 260 (Gj=GFF+GFB).

Then, the CPU proceeds with the process to a step 275 to execute processes for activating the engine actuators 32 of the engine or the brake actuator 43 of the braking device such that the requested acceleration Gj calculated at the step 270 is achieved, that is, such that the acceleration (in particular, acceleration/deceleration) of the own vehicle 10 corresponds to the requested acceleration Gj. Thereby, when the requested acceleration Gj is larger than zero, the own vehicle 10 is accelerated. On the other hand, when the requested acceleration Gj is smaller than zero, the own vehicle 10 is decelerated. Then, the CPU proceeds with the process to a step 295 to terminate the execution of this routine once.

It should be noted that when the CACC switch 21 is positioned at the OFF-position upon the execution of the process of the step 205, the CPU determines "No" at the step 205 and then, proceeds with the process directly to the step 295 to terminate the execution of this routine once. In this case, the cooperative following travel control is not executed.

Further, when the identification of the communicating preceding vehicle 11 has not been completed upon the execution of the process of the step 215, the CPU determines "No" at the step 215 and then, proceeds with the process directly to the step 295 to terminate the execution of this routine once.

It should be noted that when the identification of the communicating preceding vehicle 11 has not been completed and a vehicle is acquired by the own vehicle sensor 61 and the sensor ECU 60 as the preceding vehicle 11, in other words, the relative traveling speed dSPD, the inter-vehicle distance D, the relative orientation and the like have been acquired upon the execution of the process of the step 215, the CPU may proceed with the process to the step 265 after the CPU sets the feedforward requested acceleration GFF to zero. In this case, the inter-vehicle distance control (i.e., the feedback control) for controlling the acceleration or deceleration of the own vehicle 10 using the requested acceleration Gj (=GFB) calculated on the basis of only the feedback requested acceleration GFB is executed.

The cooperative following travel control has been described concretely. According to this cooperative following travel control, when the sensor ECU 60 has not detected the preceding vehicle (i.e., the communicating preceding vehicle 11) and the feedforward requested acceleration GFF is larger than zero, the feedforward requested acceleration GFF is set to zero (see the steps 435 and 440). Therefore, as described above, an excessive decrease of the inter-vehicle distance between the own vehicle 10 and the preceding vehicle is prevented.

It should be noted that when the sensor ECU 60 has not detected the preceding vehicle as the communicating preceding vehicle 11, for example, the brake operation amount Brkp of the communicating preceding vehicle 11 increases or any one of the wheel speeds ωa to ωd of the communicating preceding vehicle 11 decreases and the feedforward requested acceleration GFF is a negative value, the feedforward requested acceleration GFF is considered in calculating the requested acceleration Gj of the own vehicle 10 without setting the feedforward requested acceleration GFF to zero (see the determination of "No" at the step 435). Therefore, when the communicating preceding vehicle 11 starts to decelerate, the own vehicle 10 is decelerated with the prediction of the deceleration of the communicating preceding vehicle 11. Thus, the own vehicle 10 is caused to travel accurately following the communicating preceding vehicle 11 without decreasing the inter-vehicle distance D.

The present invention is not limited to the embodiment and various modifications can be employed within a scope of the present invention.

For example, when the estimated acceleration Ges is larger than zero, the control apparatus according to the embodiment may be configured simply to calculate, as the feedforward requested acceleration GFF, a value obtained by multiplying the estimated acceleration Ges by a predetermined positive correction coefficient KIIac (GFF=Ges×KIIac).

Further, when the estimated acceleration Ges is equal to or smaller than zero, the control apparatus according to the embodiment may be configured simply to calculate, as the feedforward requested acceleration GFF, a value obtained by multiplying the estimated acceleration Ges by a predetermined positive correction coefficient Klde (GFF=Ges×Klde).

Further, at the step 270, the total value of the feedback requested acceleration GFB and the feedforward requested acceleration GFF is calculated as the requested acceleration Gj of the own vehicle 10. However, for example, a weighted average of the feedback requested acceleration GFB and the feedforward requested acceleration GFF may be calculated as the requested acceleration Gj of the own vehicle 10. In other words, the requested acceleration Gj of the own vehicle 10 may be calculated in accordance with a following expression (5). In the expression (5), the symbols "α" and "β" are positive constants, respectively. The constants α and β are larger than zero and smaller than one and the constant α may be a value 1−β.

$$Gj = \alpha \times GFF + \beta \times GFB \tag{5}$$

Further, the control apparatus according to the embodiment may be configured simply to calculate, as the feedback requested acceleration GFB, a value obtained by multiplying the inter-vehicle distance difference dD by a predetermined correction coefficient KFB (GFB=KFB× dD). The correction coefficient KFB is a constant positive value larger than zero.

In addition, the control apparatus according to the embodiment calculates the feedforward requested acceleration GFF on the basis of the requested acceleration Gs and the actual acceleration Gas of the communicating preceding vehicle 11 acquired through the wireless communication. In this regard, the control apparatus may calculate the feedforward requested acceleration GFF only on the basis of the requested acceleration Gs without using the actual acceleration Gas or only on the basis of the actual acceleration Gas without using the requested acceleration Gs.

Further, when the acceleration pedal operation amount Accp and the brake pedal operation amount Brkp in place of the requested acceleration Gs are sent from the communicating preceding vehicle 11, the control apparatus according to the embodiment may be configured to acquire the acceleration pedal operation amount Accp and the brake pedal operation amount Brkp as information on the requested acceleration Gs of the communicating preceding vehicle 11, estimate the requested acceleration Gs of the communicating preceding vehicle 11 on the basis of the acceleration pedal operation amount Accp and the brake pedal operation amount Brkp and calculate the feedforward requested acceleration GFF using the estimated requested acceleration Gs.

Similarly, when the vehicle wheel rotation speeds ωa to ωd or the average vehicle wheel rotation speed ωave in place of the actual acceleration Gas is/are sent from the communicating preceding vehicle 11, the control apparatus according to the embodiment may be configured to acquire the vehicle wheel rotation speeds ωa to ωd or the average vehicle wheel rotation speed ωave as information on the actual acceleration Gas of the communicating preceding vehicle 11, estimate the actual acceleration Gas of the communicating preceding vehicle 11 on the basis of the vehicle wheel rotation speeds ωa to ωd or the average vehicle wheel rotation speed ωave and calculate the feedforward requested acceleration GFF using the estimated actual acceleration Gas.

The control apparatus according to the embodiment holds the feedback requested acceleration GFB until the time Tk elapsing since the sensor ECU 60 does not detect the preceding vehicle exceeds the predetermined time Tkth. In this regard, the control apparatus may be configured to decrease the feedback requested acceleration GFB gradually until the time Tk elapsing since the sensor ECU 60 does not detect the preceding vehicle exceeds the predetermined time Tkth. In addition, the own vehicle sensor 61 may be configured to output and receive a wave such as a light wave (for example, a laser) or an ultrasonic wave in place of the millimeter wave.

What is claimed is:

1. A control apparatus of a vehicle, comprising:
an own vehicle sensor configured to output an output wave ahead of an own vehicle and detect a reflected wave of the output wave;
an own vehicle sensor electronic control unit configured to detect a vehicle traveling in front of the own vehicle as a preceding vehicle on the basis of the reflected wave detected by the own vehicle sensor and acquire an inter-vehicle distance between the own vehicle and the preceding vehicle on the basis of the reflected wave;
a wireless communication device configured to acquire communicating preceding vehicle information including communicating preceding vehicle acceleration information on an acceleration of a communicating preceding vehicle, the communicating preceding vehicle being the preceding vehicle having a function of a wireless communication; and
an acceleration/deceleration electronic control unit configured to control an acceleration of the own vehicle such that the acceleration of the own vehicle corresponds to a requested acceleration of the own vehicle,
the acceleration/deceleration electronic control unit being further configured to:
calculate a feedback requested acceleration on the basis of the inter-vehicle distance and a target inter-vehicle distance, the feedback requested acceleration being an acceleration requested to the own vehicle for maintaining the inter-vehicle distance at the target inter-vehicle distance;
calculate a feedforward requested acceleration on the basis of the communicating preceding vehicle acceleration information, the feedforward requested acceleration being an acceleration requested to the own vehicle for causing the own vehicle to travel following the communicating preceding vehicle; and
calculate the requested acceleration of the own vehicle on the basis of the feedback and feedforward requested accelerations,
the acceleration/deceleration electronic control unit being configured to execute a following travel control for causing the own vehicle to travel following the communicating preceding vehicle by controlling the acceleration of the own vehicle such that the acceleration of the own vehicle corresponds to the requested acceleration,
wherein the acceleration/deceleration electronic control unit is configured to set the feedforward requested acceleration to zero when the own vehicle sensor electronic control unit has not detected the preceding vehicle and the feedforward requested acceleration is larger than zero after an execution of the following travel control is started.

2. The control apparatus of the vehicle according to claim 1, wherein the acceleration/deceleration electronic control unit is configured to stop a control of the acceleration of the own vehicle using the communicating preceding vehicle acceleration information when an elapsed time becomes equal to or larger than a predetermined time, the elapsed time being a time elapsed since the own vehicle sensor does not detect the preceding vehicle after the execution of the following travel control is started.

3. The control apparatus of the vehicle according to claim 1, wherein the communicating preceding vehicle acceleration information includes info' cation on a requested acceleration of the communicating preceding vehicle calculated by the communicating preceding vehicle on the basis of operation amounts of an acceleration operator and a brake operator of the communicating preceding vehicle.

4. The control apparatus of the vehicle according to claim 1, wherein the communicating preceding vehicle acceleration information includes information on a requested acceleration of the communicating preceding vehicle calculated by a control apparatus of the communicating preceding vehicle on the basis of information on an acceleration of a vehicle traveling in front of the communicating preceding vehicle acquired by a wireless communication device of the communicating preceding vehicle from the vehicle traveling in front of the communicating preceding vehicle when the control apparatus of the communicating preceding vehicle executes the same control as the following travel control for causing the communicating preceding vehicle to travel following the vehicle traveling in front of the communicating preceding vehicle.

* * * * *